May 27, 1969
G. M. LOIACONO ET AL
3,446,603
GROWTH OF LITHIUM NIOBATE CRYSTALS
Filed July 12, 1965
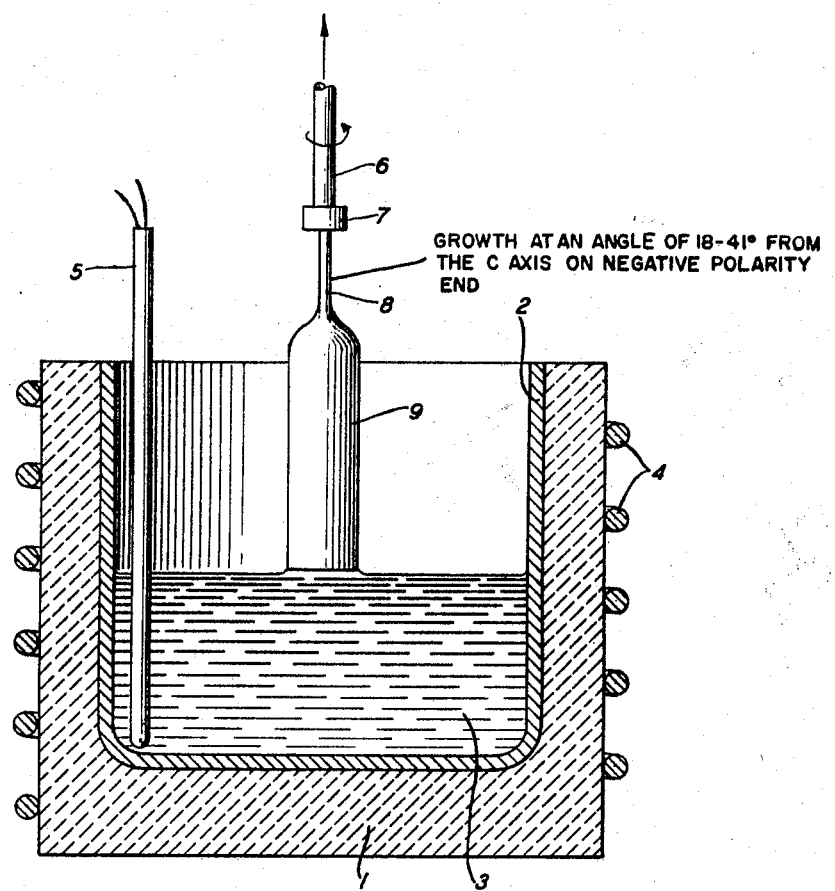
GROWTH AT AN ANGLE OF 18-41° FROM THE C AXIS ON NEGATIVE POLARITY END
INVENTORS G. M. LOIACONO
K. NASSAU
BY
ATTORNEY

United States Patent Office 3,446,603
Patented May 27, 1969

3,446,603
GROWTH OF LITHIUM NIOBATE CRYSTALS
Gabriel M. Loiacono, Lodi, and Kurt Nassau, Bernardsville, N.J., assignors to Bell Telephone Laboratories, Incorporated, New York, N.Y., a corporation of New York
Filed July 12, 1965, Ser. No. 471,157
Int. Cl. C01d 11/02; C01g 33/00
U.S. Cl. 23—301                                    4 Claims This invention is directed to improved techniques for the seed growth of lithium niobate, $LiNbO_3$ (sometimes known as lithium meta-niobate).

In recent years, there has been an acceleration of research and development directed toward materials suitable for use in circuit elements, the functions of which depend upon piezoelectricity, ferroelectricity, and various interactions of such properties with forms of electromagnetic and elastic waves. A very few years ago, the group of materials exhibiting any of these properties was dominated by quartz, barium titanate, and a few water-soluble materials which were developed during the wartime quartz shortage. In very recent years, a number of promising inorganic materials, many showing some properties superior to quartz, have emerged. These include the wurtzites, zinc oxide, cadmium sulfide, etc., lithium metagallate, and others, some of which have electromechanical coupling coefficients two or three times that of quartz, and some of which, too, have high electric or elastic values of Q, so permitting their use in proposed devices relying on interactions of piezoelectric properties and wave motion.

During the past years, there has been increased activity directed toward yet another piezoelectric material. This material, lithium niobate, $LiNbO_3$, is in many respects the most exciting of the single crystal piezoelectrics. It is already known that lithium niobate has an electromechanical coupling coefficient of the order of 50 percent, so manifesting a conversion efficiency in a single crystal material for the first time comparable with the best available in the ceramic ferroelectric materials now finding use in transducers. Elastic Q values determined from decay time experiments conducted at 500 megacycles per second are of the order of $10^5$, a value comparable to those of yttrium-iron garnet and yttrium-aluminum garnet, both of which are near isotropic.

Lithium niobate is a water-white material which is transparent over the entire visible spectrum and beyond, including the bandwidth of from 0.4 micron to about 4.5 microns.

These properties have prompted an intensive study directed to the use of lithium niobate in a vast class of devices. It has been found, for example, that lithium niobate has a birefringence larger than its dispersion for a significant portion of the optical region, so permitting its use as a phase-matchable optical conversion material (harmonic generator, parametric amplifier, etc.). See, for example, Applied Physics Letters, volume 5, pages 234–236 (1964) and Physical Review Letters, volume 14, page 973 (1965). Many other device uses involving the above properties are now under study.

The lithium niobate story began to unfold in 1949, Physical Review, volume 76, page 1886, at which time the authors of that article, B. T. Matthias and J. P. Remeika, having grown some crystals from a lithium fluoride flux, reported the resulting compositions along with a number of ferroelectric materials grown in similar fashion. For a number of years, attempts were made to determine whether lithium niobate crystals were ferroelectric. While, based on anology with lithium tantalate, it was thought that the niobate was ferroelectric, and the material was so reported in the literature, attempts over the years to measure this property were unavailable. For this reason, until recently there has been little device interest in the material.

Recently, it was discovered that lithium niobate is congruently melting and that large crystals of apparent perfection can be grown by crystal pulling (Journal of the American Ceramic Society, volume 48, page 112 [1965]). It was on crystals grown in this fashion that the first promising piezoelectric and optical properties were measured. While it was then becoming apparent that this material had great promise for device use, it was found that all such crystals contained structure, later identified as ferroelectric domain walls (Applied Physics Letters, volume 6, page 228 [1965]), revealed in polishing, etching, or optical examination. It was at once determined that samples useful for many device uses had to be so cut as to contain no such structure. Unfortunately, for many devices, the usable regions in even the best crystals grown by ordinary pulling were of less than one millimeter in maximum dimension. While the properties observed in such selected crystalline sections were very promising, and while such sections could, if necessary, have found use in commercially produced devices, it was readily apparent that an improved growth technic was desirable.

In accordance with this invention, there is described a technique whereby seeded growth, for example by crystal pulling, Bridgeman-Stockbarger, zone melting, or other melt growth techniques, results in crystals, appreciable regions of which are essentially structure free. Such crystalline growth is found to be critically dependent upon the seed orientation and also on the amount and kind of melt additives. In essence, it is found necessary that the negative polarity end of the seed crystal must form a solid-liquid interface with the melt and that it be oriented between 18 and 41 degrees from the c axis. It is also essential for the purposes of this invention that the melt, approximately stoichiometric with respect to the intended compound, contain, as an added ingredient, from 0.1 to five atom percent of molybdenum or tungsten based on the amount of niobium in the melt. Negative polarity is here based on the known pyroelectric property of the material. It has been found that this pyroelectric polarity is, in turn, related to the etching behavior in the manner described in Applied Physics Letters, volume 6, supra.

Apart from inversion of the seed as a whole, seed orientations are conveniently expressed in X-ray crystallographic terms, planes being designated as $(hk \cdot l)$, based on a hexagonal indexing with $a=5.127$ A. and $c=13.856$ A., and directions being designated as perpendicular to such planes. In this system, the c axis is perpendicular to $(00 \cdot 1)$.

In addition to the seed orientation and melt additions specified above, both of which are essential to this invention, it is desirable to follow the practices which have been found useful in the various seeded growth techniques. For example, it is desirable to minimize the number of defects in a seed, although in this connection it is found that defect-free interfacial material perpetuates itself in the growing crystal and so results in a larger defect-free region. In common with other crystal-growing techniques, adequate mixing, controlled temperature gradient, reasonably slow rate of growth, etc., are all conducive to a more nearly perfect crystalline end product. While it has been specified that the seed crystal need be of negative polarity at that end which contacts the melt, it has been found that a certain amount of domain structure is, nevertheless, tolerable in the seed. In fact, any seed crystal showing predominant negative polarity as determined by the etch procedure set forth in Applied Physics Letters, volume 6, supra, is suitable for the purposes herein.

Reference is made to the drawing in the description of the invention. The figure is a front elevational view, partly in section, of apparatus suitable for use in the practice of the invention.

The apparatus depicted in the figure is illustrative of the many varieties which may be utilized. This particular apparatus is useful for practicing Czochralski growth and includes a crucible support 1, which in this instance is constructed of alumina, and so performs the additional function of thermally insulating the inner crucible 2, which is constructed of a precious metal such as platinum and which, in turn, contains melt 3, which, as has been noted, is largely composed of a near stoichiometric mixture of lithium niobate, which may be prepared by sintering lithium carbonate and niobium oxide to which has been added from .1 to five atomic percent of tungsten or molybdenum based on the amount of niobium present in the melt.

While the melt may be prepared by putting the lithium carbonate and niobium oxide directly into the crucible, the copious quantities of carbon dioxide so liberated suggest the desirability of pre-sintering before inserting in the crucible. It is permissible to deviate from stoichiometry by ±5 percent or greater with respect to niobium to lithium ratio of unity. Tungsten or molybdenum may be already present in the melt as an oxide, $WO_3$ or $MoO_3$, and either addition may be made in such form. Alternately, the addition may be made in any form which may be regarded as resulting in the presence of either or both such oxides in the melt.

In general, the normally encountered impurities, in fact also deliberately added impurities such as tantalum in amounts as high as five atom percent based on niobium, have little effect on the domain wall-free end product. However, depending on the end use to which the crystal is to be put, it may be desirable to maintain exceedingly close stoichiometry, to exclude to a large extent most or all impurities, or, in fact, as has been noted, to make additions. Where extreme purity and close soichiometry are particularly desirable, it has been found that this may be accomplished by initially growing crystalline material in accordance with any single crystal growth technique, and to utilize this end product, rendered molten, as the melt for the controlled procedure to which this invention is directed.

Melt 3 is rendered and maintained molten by means of a heating source 4, here illustratively depicted as R.F. heating coils. In keeping with usual good crystal growing practice, it is desirable to maintain the melt at a near constant temperature (in this instance at a nominal value of about 1300° C.), and to this end the depicted apparatus is provided with a thermocouple sensing means 5. The apparatus is provided, too, with a spindle 6, which is slowly raised and preferably rotated by means not shown, such spindle being provided with chuck 7, holding a seed crystal 8, upon which there has solidified grown crystal 9 at the stage of operation at which the apparatus is depicted. Seed 8 is, of course, oriented with its negative end down and at between 18 and 41 degrees of the c axis, as noted above.

The pulling mechanism, not depicted in the figure, should be such as to permit growth at a rate of four inches per hour or less. Consistent with common experience in crystal pulling, crystal perfection is improved by still slower rates (down to of the order of one-tenth inch per hour), at least during the bulk growth at which full diameter has been attained. Rotation of the crystal, or of the crucible relative to the crystal, minimizes the effect of any temperature gradients about the periphery of the crystal and serves also to stir the melt. If such rotation is to be useful, it is desirable that it be at a rate of at least five r.p.m.

The crystal pulling apparatus depicted in the figure should be understood as being merely exemplary. The advantages of the invention obtain for any other crystal growing technique in which crystallization proceeds upon an oriented seed. In most instances, it is preferable that any such technique make use of a separately inserted seed, whether the apparatus be designed for Czochralski, Bridgeman-Stockbarger or Verneuil growth, or for zone melting. It is possible, however, by variation of the Bridgeman-Stockbarger technique to initially grow an oriented seed by appropriate shaping of the cavity portion in which nucleation occurs, so as to produce the appropriate polarity and orientation. Such is to be considered a variation of seeded growth for the purpose of this description.

The following examples are selected to illustrate some of the conditions which have resulted in substantially domain wall-free lithium niobate crystals.

Example 1

A 100 gram melt was produced by first sintering a mixture of 25 grams lithium carbonate $Li_2CO_3$ with 90 grams niobium oxide $Nb_2O_5$ at a temperature of about 1000° C. for a period of ten hours. The sinter was then placed in a platinum crucible such as crucible 3 of the apparatus depicted in the figure. The particular crucible was of five centimeter depth and 5 centimeter I.D., and 0.5 gram of molybdenum oxide, $MoO_3$, representing approximately 0.5 atom percent molybdenum based on the niobium present, was added. The contents were melted by use of an R.F. heating coil. Both melting and sintering were carried out in air, and it is considered preferable for these purposes that such operations be carried out in an oxygen atmosphere to minimize the likelihood of oxygen deficiencies in the final material. However, as is noted, small deficiencies when they occur can be removed by a subsequent treatment described in this example. A seed crystal, approximately one-half inch in length and one-tenth inch in diameter, oriented at 28° from the c axis toward the direction perpendicular to (21.0) with its negative polarity end downward, was brought into contact with the melt and allowed to remain in such position for approximately ten minutes to bring it into thermal equilibrium. The seed was then withdrawn at a rate of three-quarter inch per hour while being rotated at approximately 100 r.p.m. Under these conditions, the crystallizing matter attained a diameter of about one centimeter, which remained substantially constant during drawing. A total length of approximately five centimeters was grown. Growth was terminated by slowly raising the temperature of the melt over a half-hour period so as to taper and finally terminate growth, at which time the grown crystal was removed from the growth apparatus.

The crystal was then annealed in oxygen at a temperature of 1100 degrees for a period of ten hours, during which time the pale tannish color, usually attributed to oxygen deficiency, bleached out, leaving a water-white crystal.

The crystal was sectioned and polished, as described in Applied Physics Letters, volume 6, supra. Optical and microscopic examination revealed freedom from domain walls over a major portion of the crystal.

Example 2

The procedure of Example 1 was followed, however with addition of approximately 0.5 gram of additional niobium oxide, representing approximately 0.5 atom percent additional niobium. The final crystal, of approximately the same dimensions, was found to be also essentially domain wall free over a major portion.

Example 3

The procedure of Example 2 was repeated, however using one gram molybdenum oxide corresponding to one atom percent molybdenum and utilizing a seed oriented at 38° from the c axis toward the direction perpendicular to (21.0) and pulling at one-half inch per hour. The final crystal was again found to be essentially domain wall free over a major portion.

Example 4

The procedure of Example 1 was followed, with the exception that one gram $MoO_3$, representing one atom percent molybdenum based on niobium present, was used, utilizing a seed oriented 24° from the c axis toward the direction perpendicular to (11.0) and pulling at one inch per hour. The resultant crystal was again found to be domain wall free over a major portion.

Example 5

The procedure of Example 1 was repeated, however using one-half gram tungsten oxide, corresponding to 0.3 atom percent tungsten and one gram $Nb_2O_5$, corresponding to one atom percent niobium, and utilizing a seed oriented at 21° from the c axis toward the direction perpendicular to (10.0) and pulling at one-half inch per hour. The final crystal was again found to be essentially domain wall free over a major portion.

The above examples were chosen to show a variation in the more significant parameters of growth only in those parameters of growth perculiar to the procedures herein. Accordingly, no examples are included to show permissible variations in growth rate, rotational rate, and other parameters common to prior art procedures.

The invention has been described in terms of a limited number of exemplary embodiments. Other suitable variations will be apparent to those skilled in the art, and it is considered that all such variations are within the scope of the invention. Certain of the conditions common to the examples were adopted with a view to a particular end use. So, for example, the annealing step, effective in bleaching the tan coloration is useful primarily where the device application is based on light transmission.

What is claimed is:

1. Procedure for the seeded growth of lithium niobate comprising freezing material from a melt containing from 0.1 atom percent up to five atom percent based on niobium of at least one ion selected from the group consisting of molybdenum and tungsten on a seed crystal so arranged that growth on the seed is at an angle of between 18 degrees and 41 degrees from the c axis and in which growth proceeds on the negative polarity end of the said crystal.

2. Procedure of claim 1 in which the said seed is inserted in the said melt and is subsequently withdrawn so as to produce growth.

3. Procedure of claim 2 in which the said seed is rotated during withdrawal.

4. Procedure of claim 3 in which the lithium niobium ratio in the melt is within ±5 percent of unity.

References Cited

UNITED STATES PATENTS 3,346,344  10/1967  Levinstein _____ 23—301

NORMAN YUDKOFF, *Primary Examiner.*

G. P. HINES, *Assistant Examiner.*

U.S. Cl. X.R.

23—302